March 10, 1953    C. J. BENDER    2,630,661
DISK HARROW HITCH
Filed Jan. 23, 1948    2 SHEETS—SHEET 1
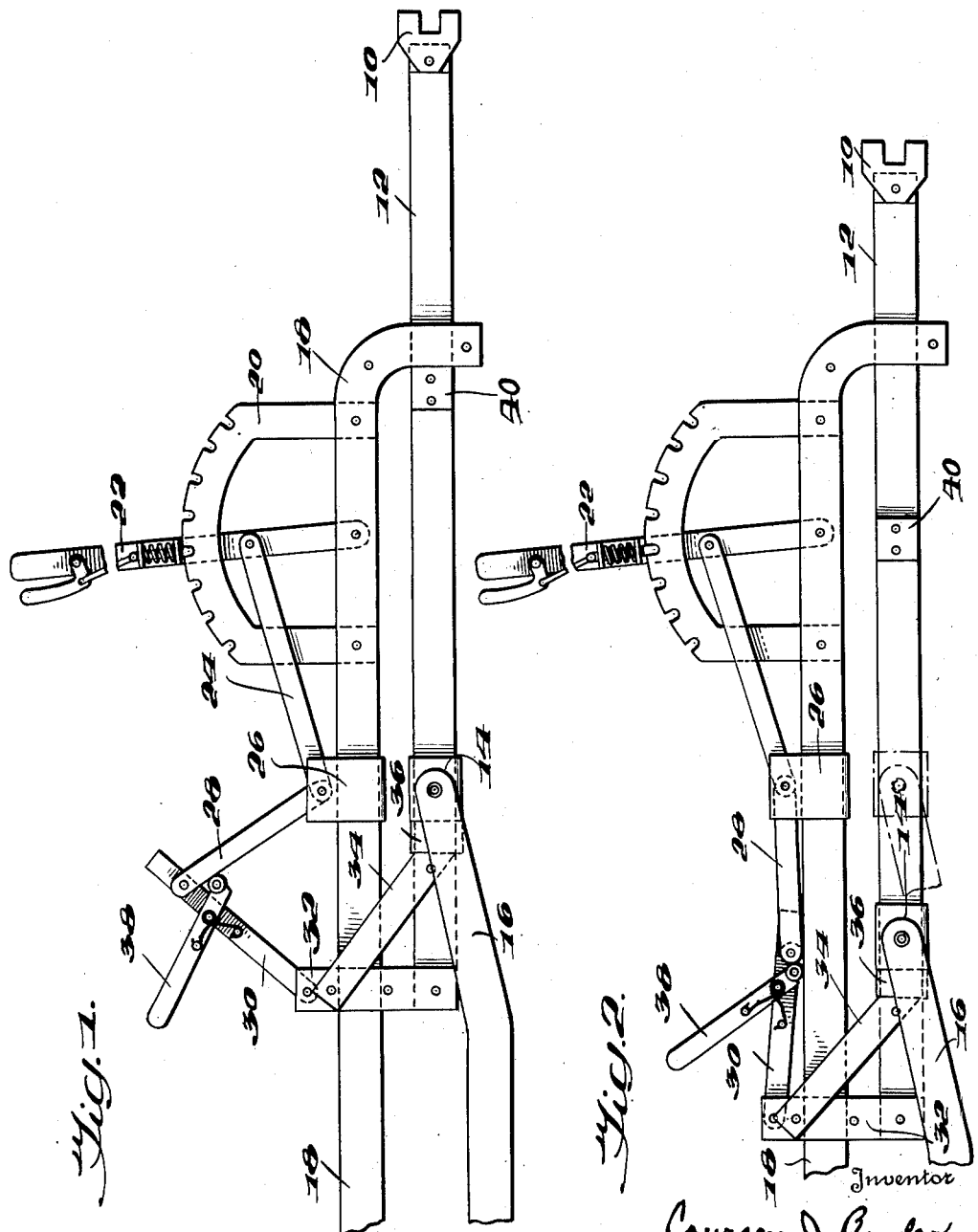

March 10, 1953 C. J. BENDER 2,630,661
DISK HARROW HITCH
Filed Jan. 23, 1948 2 SHEETS—SHEET 2
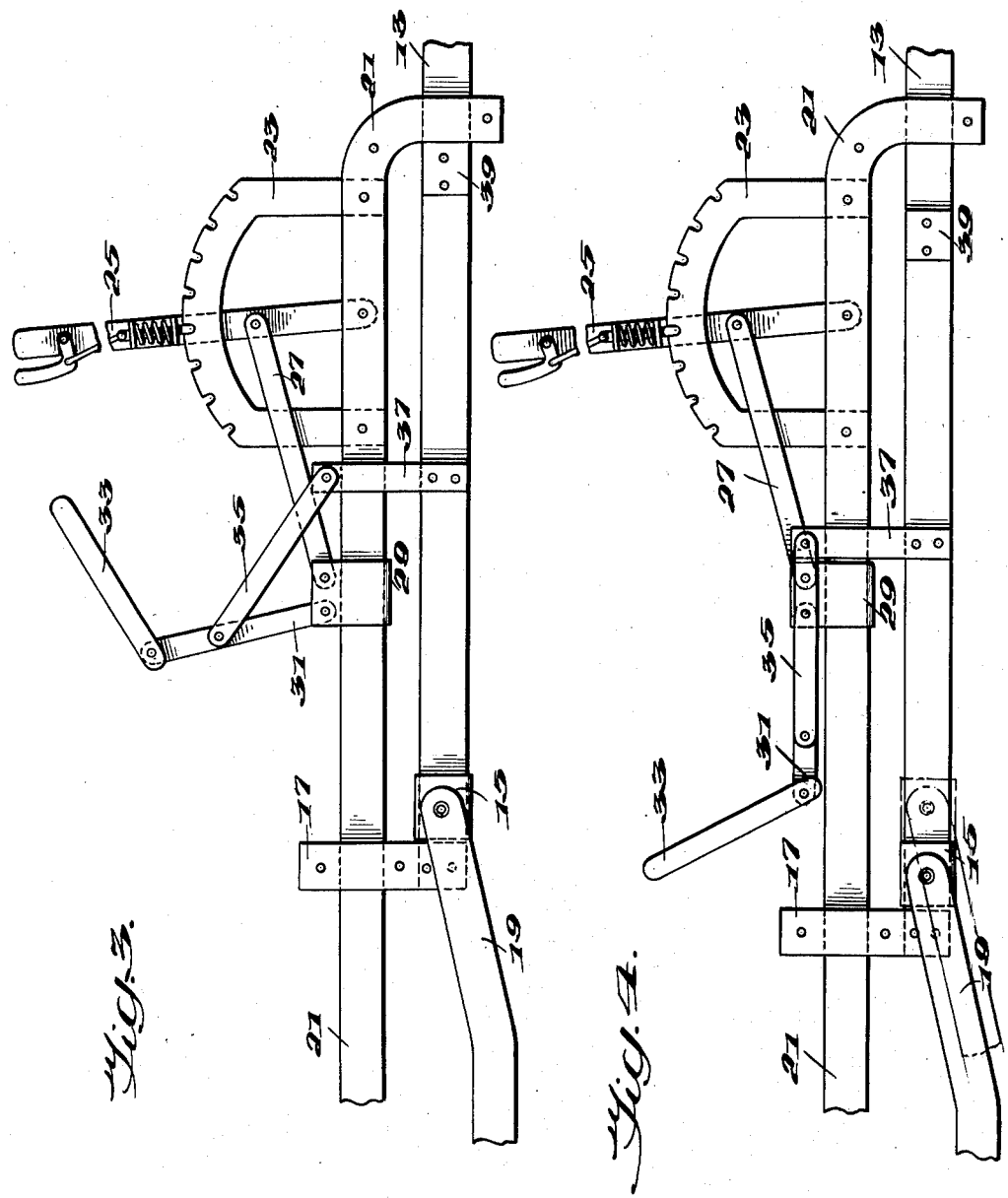
Inventor
Coursey J. Bender
By H. Hamlin Hodges
his Attorney Patented Mar. 10, 1953

2,630,661

UNITED STATES PATENT OFFICE 2,630,661

DISK HARROW HITCH

Coursey J. Bender, Aberdeen, Miss.

Application January 23, 1948, Serial No. 3,863

1 Claim. (Cl. 55—81)

In the past disk harrow hitches have been provided, but it has been found that these hitches are not all entirely satisfactory. It is generally desirable to have an adjustment between the pull applied directly to the disk harrow frame, and that applied to the disk gangs.

An object of my invention is to provide a disk harrow hitch which may be adjusted so that pull may be applied to the disk harrow frame, and simultaneously to the disk harrow gangs.

A further object is to provide a disk harrow hitch whereby pull may be applied to the disk harrow frame and disk harrow gangs, adjustably positioning the gangs for either transport or working purposes.

In the accompanying drawings:

Fig. 1 is a fragmentary side elevation of the harrow hitch in a position for transport;

Fig. 2 is a fragmentary side elevation of the harrow hitch in a position for working;

Fig. 3 is a fragmentary side elevation of a modified form of a harrow hitch in a position for transport; and Fig. 4 is a fragmentary side elevation of the modified form of harrow hitch in position for working.

The drawings are purposely fragmentary in their representation of a hitch, but it will be understood that the portion of the hitch, which is shown, is the portion which is to be attached to a tractor or other draft implement. At the forward end of the hitch a tractor is coupled and a disk harrow and its disk gang is attached at the rear end thereof. With this arrangement I provide a conventional coupling 10, (not shown in Figs. 3 and 4) which may be attached to a suitable tractor or other draft appliance. The coupling 10 is suitably secured to a draw bar 12 on which is positioned a disk gang draw bar pull sleeve 14 to which a disk gang draw bar 16 is pivotally secured. Although only one disk gang draw bar 16 is shown, it will be understood that a duplicate thereof is pivoted to the opposite side of the disk gang draw bar pull sleeve 14. The disk gang draw bar pull sleeve 14 encircles the draw bar 12 and may be adjusted relative to the hitch frame 18, as will be described more fully hereinafter.

The draw bar 12 slides relative to the hitch frame 18. (Actually, the draw bar 12 may be moved backwards or forward relative to the hitch frame 18, by the backward or forward motion of the tractor or other propulsion vehicle.) The hitch frame 18 as shown is only the central part of the main hitch frame (a conventional triangularly constructed hitch frame) and is bolted solidly in position. The hitch frame 18 is slideable relative to the length of the draw bar 12 by adjustment which will be more fully described hereinafter.

It will be clearly understood that the center bar of the hitch frame or coupling 18 to the left of the drawing (where the same is broken off) will be secured to the disk harrow hitch frame. Secured to the hitch frame or coupling, by suitable rivets, bolts or welding, I provide a conventional adjusting sector 20 in position to be engaged by a pawl provided on a conventional adjusting lever 22.

Pivotally connected to the lever 22, I provide an adjusting lever connecting link 24 which at the other end thereof is pivotally secured to an adjusting lever connecting link guide 26, which guide is adapted to slide freely over the hitch frame or coupling 18. Also pivoted to the adjusting lever connecting link guide 26, I provide a locking bar 28 which is pivotally held to the adjusting lever connecting link guide 26 by the same pivot pin. The end of the locking bar 28, remote from its pivot point on the adjusting lever connecting link guide 26, is pivotally secured to an additional locking bar 30, the other end of which is pivotally fastened to a leg 32, which in turn is riveted and securely held on the end of the draw bar 12 remote from the coupling 18. The leg 32 is further secured, in its position perpendicular to the draw bar 12, by a suitable bracing link 34, one end of which is riveted or otherwise secured to the draw bar 12. The leg 32, although shown in the drawing as being of one piece only, is preferably provided with two pieces; one as shown clearly, and the other being on the opposite side of the locking bar 30, the coupling 18 and the draw bar 12, the pivot point and rivets as described above extending through both legs 32 and securely fastening them together. It will be understood, of course, that the two legs 32 arranged on each side of the hitch frame coupling 18 will provide sufficient tolerance so that it may slide between the two legs when the locking links 28 and 30 are changed from the position in which they were shown in Fig. 1 to that shown in Fig. 2.

Secured to the draw bar 12, and abutting against the bracing link 34, I provide a block 36 which is positioned to serve as a stop for the disk gang bar pull sleeve 14. The block 36 is adapted to be of suitable thickness to hold the disk gang draw bar pull sleeve a predetermined distance from the bracing link 34, so that the disk gang will be held in proper position relative to the draw bar 12. In this position the disks will be held so that the whole disk harrow is in a transport position. (See Fig. 1.)

In order to change the disk harrow so that the disks can assume a working position it is only necessary to reverse or back the tractor or draft appliance a few inches. By reversing the tractor, the draw bar 12 and its associated mechanism will be forced backwardly relative to the hitch frame coupling 18 and its associated mechanism described above.

When the tractor is reversed and the draw bar 12 is forced backwardly, the locking links 28 and 30 drop into the position in which they are shown in Fig. 2 and hold the connecting link guide 26 a predetermined distance from the leg 32. If in doing this only enough movement has been used to permit lock bars 28 and 30 to drop into position, the harrow as a whole has not been moved, the disk gangs having remained stationary. If too much effort has been used in backing the tractor, the whole harrow simply moves backward, without changing the angle of the disk gangs. In this position and before any forward movement of the tractor, the sleeve 14 has kept its position in relation to the hitch frame, (as shown in dotted line in Fig. 2), being removed from block 36 by the distance the draw bar 12 has slid backward in relation to the hitch frame 18, which distance is limited by the adjustment of lever 22. After the tractor starts forward all the pull is transmitted through locking links 28 and 30, adjusting lever connecting link 24, and adjusting levers 22, into hitch frame 18. At this time the sleeve 14 is away from its stop block 36.

Thus all the pull from the tractor is applied to the disk gangs at the rear outer corners of the triangular hitch frame (referred to above) until the block 36 comes into contact with the sleeve 14 and the pull applied to the disk gang draw bar 16, equalizing the pull at the outside and inside of the disk gangs.

To change from working to transport position the trip lever 38 is pulled forward causing the locking device to release. This releases all pull to the outside of the disk gangs and applies it all to the sleeve 14 and to the inside of the disk gangs through the disk gang draw bar 16. The draw bar 12 pulls the disk gangs into transport position, which position is maintained by the stop block 40, mounted on the draw bar 12, resting against the hitch frame 18 at its front end (to the right in the figures). In this position when the harrow is moved, the pull is divided between the sleeve 14 and the disk gang draw bar 16, to the inside of the disk gangs, and the triangular hitch frame 18 to the outside of the disk gangs.

In the modified form of my disk harrow hitch, I provide a conventional draw bar 13 to the end of which is attached a suitable coupling for fastening the draw bar to a tractor implement (not shown, to the right of Figs. 3 and 4). Mounted on the draw bar 13, near the end thereof remote from the coupling, I provide a disk gang draw bar pull sleeve 15 which is adapted to freely slide over the draw bar 13 until it comes into abutment with a leg 17 secured to the draw bar 13 at approximate right angles. Pivotally secured to the disk gang draw bar pull sleeve 15, I provide a disk gang draw bar 19 which is adapted to be securely fastened to a disk gang (not shown). Slidably mounted on the draw bar 13 I provide a harrow hitch frame 21 which is adapted to slide relative to the draw bar 13. Riveted, welded or bolted to the harrow hitch frame 21 I secure a conventional adjusting sector 23 which is provided with a rack positioned to be engaged by a pawl provided on a conventional adjusting lever 25.

Pivotally connected to the lever 25 an additional adjusting lever connecting link 27 is attached at one end thereof and is pivoted at the opposite end thereof to an adjusting lever connecting link guide 29. The adjusting lever connecting link guide 29 is adapted to surround and slide freely over the harrow hitch frame 21. Also pivoted to the adjusting lever connecting link guide 29 I provide a locking bar 31, to the end of which is secured a trip lever. I provide an additional locking bar or link 35, one end of which is pivoted to the locking bar 31, the other end being pivoted to a leg 37. The leg 37 is secured at approximate right angles to the draw bar 13 and is adapted to enclose and slide over the harrow hitch frame 21. Although the leg 37 appears to be one piece of metal only, it will be understood that the leg 37 is composed of two pieces of metal which straddle the harrow hitch frame 21 and provide sufficient tolerance so that the frame may readily slide therebetween. Also it will be understood that the leg 37 will be suitably braced (similar to the bracing link 34 in Figs. 1 and 2).

The operation of this modified form of disk harrow hitch is substantially the same as the form described above.

This modified form is designed primarily to be adapted for use in conjunction with relatively small disk harrow gangs and frames.

It will be understood that the harrow hitch frame 21 at the right-hand end (as viewed in the figures) is preferably composed of two thicknesses of strip material positioned to enclose the draw bar 13. Sufficient tolerance is provided so that the harrow hitch frame 21 may permit the draw bar 13 to slide easily therethrough until locking bars 31 and 35 stop its movement. As in the preferred form described above, only enough reverse movement of the tractor will be made to permit the locking bars 31 and 35 to drop into position (see Fig. 4), the harrow as a whole not being moved, the disk gangs having remained stationary. After the locking bars 31 and 35 are in their locking position the disk harrow will be ready to assume its working position on forward motion of the tractor.

Also it will be understood that the legs 17 and 37 extending approximately perpendicularly from the draw bar 13, embrace the harrow hitch frame 21, but provide sufficient tolerance so that the draw-bar 13 may slide freely relative to the harrow hitch frame.

The conventional adjusting levers 22 and 25 are standard in form and are provided so that desired changes may be made from time to time to regulate the angle of the disk gangs.

I claim:

A hitch for a disk harrow including a draw bar, a coupling slidable longitudinally thereof, means hingedly securing the said draw bar to a disk gang, means securing the said coupling to a disk harrow frame, and hinged link means fastening the said draw bar and coupling together, the said link means comprising one link hinged to a leg secured to the draw bar and one link hinged to a lever secured to the said coupling.

COURSEY J. BENDER.

REFERENCES CITED

The following references are of record in the file of this patent:

UNITED STATES PATENTS

| Number | Name | Date |
| --- | --- | --- |
| 1,525,335 | Sutfin | Feb. 3, 1925 |
| 1,753,198 | Boda | Apr. 8, 1930 |
| 2,381,588 | Hall | Aug. 7, 1945 |
| 2,470,008 | White et al. | May 10, 1949 |